May 23, 1944.    R. A. GOEPFRICH    2,349,345
PISTON
Filed Feb. 11, 1942    2 Sheets-Sheet 1
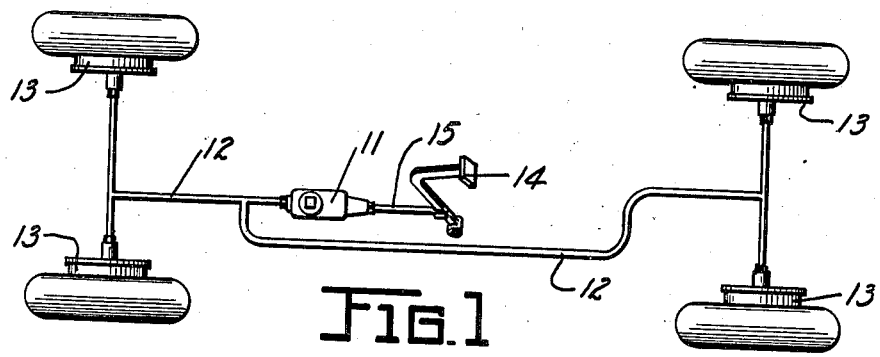
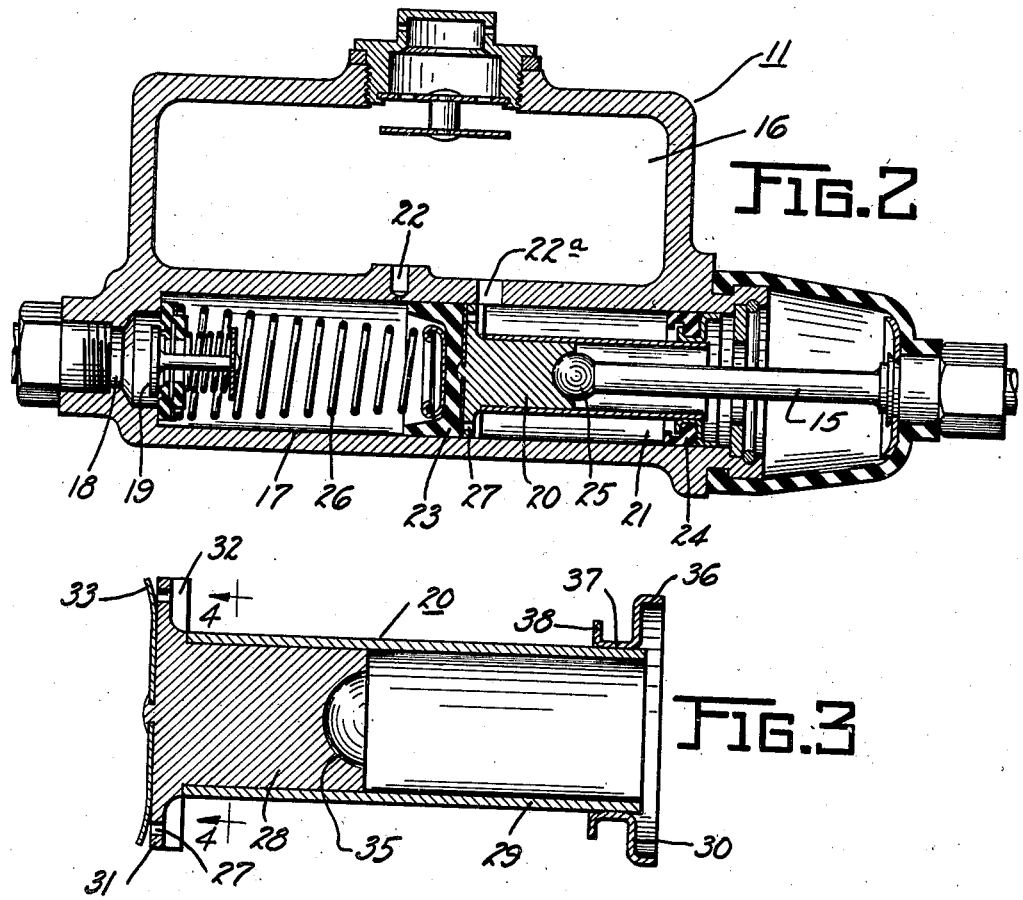
INVENTOR
RUDOLPH A. GOEPFRICH
BY
M. W. McConkey
ATTORNEY May 23, 1944.　　　R. A. GOEPFRICH　　　2,349,345
PISTON
Filed Feb. 11, 1942　　　2 Sheets-Sheet 2
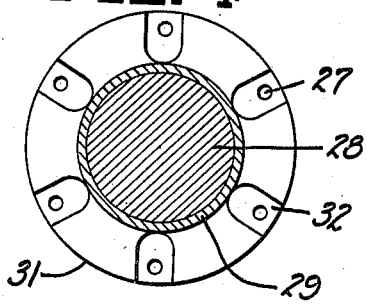
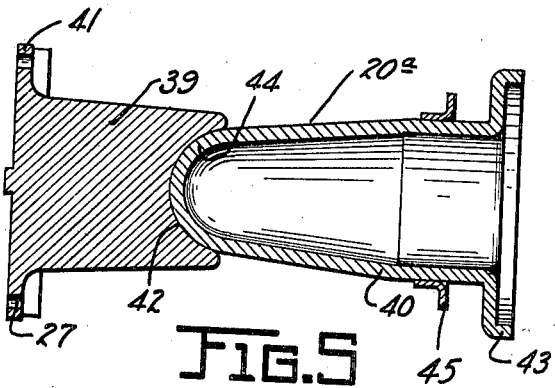
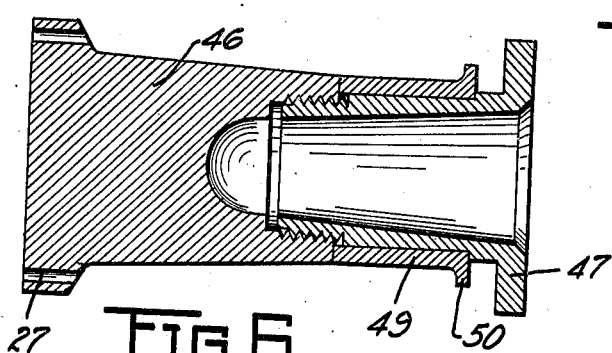
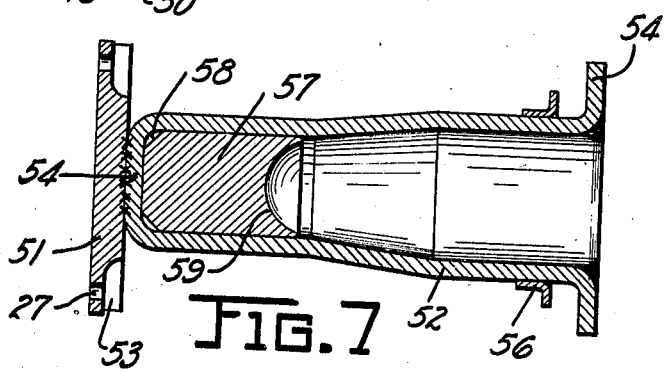
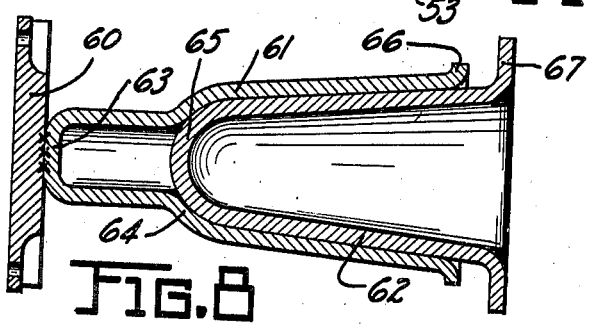
INVENTOR
RUDOLPH A. GOEPFRICH
BY M. W. McConkey
ATTORNEY Patented May 23, 1944

2,349,345

UNITED STATES PATENT OFFICE 2,349,345

PISTON

Rudolph A. Goepfrich, South Bend, Ind., assignor to Bendix Aviation Corporation, South Bend, Ind., a corporation of Delaware Application February 11, 1942, Serial No. 430,321

7 Claims. (Cl. 309—4)

This invention relates to pistons or pressure transmitting devices for use in connection with hydraulic pressure transmission mechanism. In my earlier application, Ser. No. 393,647 filed May 15, 1941, and issued January 19, 1943, as Patent No. 2,308,875, I described the structures of and methods for making pistons which are useful in the wheel or motor cylinders of hydraulic brake systems; in this application I have directed my attention particularly to pistons which may be utilized in the conventional master cylinders of hydraulic brake systems.

According to the present custom, pistons for use in hydraulic wheel cylinders and hydraulic master cylinders of the common hydraulic brake systems are formed of aluminum, and the forming process consists in die-casting the metal to give it the desired shape and then grinding the outer surface of the piston to obtain a piston diameter which will conform closely to the inner diameter of the cylinder in which the piston is to be used. There is at present the possibility of scarcity of aluminum as a material for such use and it is therefore desirable to, wherever possible, substitute a more easily available and plentiful material.

It is therefore one object of my invention to provide a piston for use as described above which piston may be formed of a metal other than aluminum, preferably steel. This requires a different method for forming the piston, inasmuch as it is impracticable to use a die-casting process in making steel pistons.

It is a further object of this invention to find an inexpensive and yet entirely satisfactory process for making pistons for use as described above. I have therefore, furnished a piston made from steel stampings, although brass or other metal may be utilized, and from parts formed by an upsetting process, preferably of steel. Inasmuch as stamping is one of the best ways, from a standpoint of both expense and satisfaction, for forming or shaping metal parts, it will be appreciated that my piston has definite advantages from a manufacturing standpoint.

It may therefore be said to be an object of my invention to form a master cylinder piston which will not utilize aluminum and which will at the same time not be made by an expensive casting process. Among other pistons described in this application is a piston which may best be formed of plastic material, the material in powdered form being placed in a mold and then heated. One of the pistons described is formed from an upset piece, a tube cut to the proper length, and a stamping. Another piston described is formed from an upset piece, and a pair of stampings. Still another piston is formed from three stampings, while yet another is formed from three stampings and a block of metal.

Other advantages, objects and features of my invention will be apparent during the course of the following description wherein reference is made to the accompanying drawings in which:

Fig. 1 is a diagrammatic showing of a conventional braking system which may utilize my invention;

Fig. 2 is a vertical section taken through the master cylinder of Fig. 1;

Fig. 3 is a close-up of the master cylinder piston of Fig. 2 in section;

Fig. 4 is a view taken on the line 4—4 of Fig. 3; and

Figs. 5, 6, 7, and 8 show modifications of the master cylinder piston of Fig. 3.

The hydraulic braking system of Fig. 1 which is shown merely to illustrate the use of pistons formed according to my invention, comprises a master cylinder 11, connected by a plurality of conduits 12 to hydraulically applied wheel brakes indicated generally at 13, and a lever 14 operable by physical force and connected by a rod 15 to the piston of master cylinder 11.

In Fig. 2 the interior of master cylinder 11 is shown, said master cylinder having a reservoir portion 16 and a cylinder bore 17. The cylinder bore 17 opens through port 18 to the conduits 12, and a two-way check valve indicated generally at 19 controls the passage of fluid between cylinder bore 17 and port 18. A piston indicated generally at 20 is reciprocable in the bore 17, said piston having at each end thereof a portion having a diameter substantially equal to the inner diameter of the cylinder bore and having between its ends a portion of reduced diameter forming an annular chamber 21 between the ends of the piston. A compensating port 22 connects the reservoir 16 to the cylinder bore 17 ahead of piston 20, while supply port 22a connects the reservoir 16 to chamber 21. A sealing cup 23 is positioned against the forward or leftward end of piston 20 to prevent escape of fluid past the piston when the piston moves to the left on its pressure stroke.

While an annular sealing element 24 is positioned adjacent the right or rearward end of the piston to prevent the movement of fluid from chamber 21 out of the cylinder bore, a ball 25 on the end of rod 15 bears against piston 20 so that force may be transmitted from the lever 14 to the piston. A compression spring 26 simultaneously urges piston 20 toward its retracted position and urges check valve 19 to seat against the end wall of the cylinder bore. As will be readily understood by those conversant with the art, force exerted by the operator on lever 14 will move the piston 20 to the left putting the fluid ahead of the piston under pressure and applying the brakes. During the brake applying movement of piston 20, sealing member 23 prevents escape of fluid from the chamber in front of the piston to the reservoir via either compensating port 22 or supply port 22a. A plurality of passages 27 are provided through the forward end of piston 20 so that on the return stroke of the piston, as a vacuum is created ahead of the piston, fluid may move from chamber 21 through passages 27 and around the sealing cup 23 to destroy the vacuum ahead of the piston.

Figures 3–8 inclusive are directed to showing various constructions of the piston 20. In Fig. 3 the piston comprises a forward or head portion 28 which may be shaped by an upsetting process, a body portion 29, which may be formed by cutting a tube to the desired length, and a skirt portion 30 which may be formed as a stamping. The head portion 28 is preferably formed by a cold upsetting process in which a cylindrical bar having a diameter equal to the smallest diameter of the finished portion 28 is placed in a supporting die and then upset to form an outwardly extending annular flange 31 having a diameter approximately equal to the internal diameter of the cylinder bore. The upset is accomplished by exerting a tremendous force against the die supported bar to squash or spread the bar and thus form the flange 31. After the upsetting process the outer circumference of the flange 31 may if necessary be trimmed or ground to the exact dimensions desired. The head flange 31 is preferably formed with a plurality of grooves 32 (note Figure 4) so that the openings 27 may be punched through the head flange at the bottoms of the grooves. Generally a punching process can be safely used only where the length of the hole to be punched is not substantially greater than the diameter of the hole. Although it is desirable to have the head flange 31 relatively thin at the places where passages 27 are to be formed, the rest of the head flange is left at full thickness for maintaining strength and solidity in the piston head. A light spring metal member 33 having a plurality of radially extending arms each covering one of the passages 27 may be positioned on the face of the piston and held thereto by flattening the outer end of a small knob or projection on the piston head. The arms of the metal member 33 prevent the pressure of fluid in chamber 17 from forcing the back wall of the sealing cup 23 into the passages 27 but do not prevent fluid from by-passing the fluid cup 23 during the return stroke of the piston. A semi-spherical depression 35 is provided in the small diameter end of the head portion 28 to accommodate the ball 25 on the end of rod 15. The tube member 29 may, as stated, be formed by cutting prefabricated steel tubing to the desired length. The tube may originally be made in any one of several ways and may be either welded tubing or seamless tubing. The tube or body 29 may be secured to the head portion 28 either by fitting them so closely that the tube may be pressed onto the head and thus secured thereto, or the tube and head may be welded or brazed together along their contacting surfaces. The skirt portion 30 is preferably a stamping, formed by the various processes which constitute a stamping process. In this particular case the stamping operations would include first a blanking operation to cut a disk of the desired size, second a forming operation to raise an axially extending flange 36, third, a drawing operation to shape an axially extending inner wall 37 and finally another forming or shaping operation to shape a radially extending flange 38. In order adequately to secure the skirt portion 30 to the body or tube portion 29, it may be pressed onto the tube portion or it may be desirable to weld or braze them together along their contacting surfaces. If desired, the skirt portion 30 might also be formed by a turning process.

The modified piston 20a of Fig. 5 comprises a head portion 39 preferably formed by an upsetting process and a body portion 40 formed as a stamping. The head portion 39 may be formed by a process similar to the process described for forming the head portion 28 of Fig. 3. The head portion 39, in Fig. 5 as in Fig. 3, has a radially outwardly extending flange 41 at the front thereof which gives the front of the piston a diameter corresponding substantially to the inner diameter of the cylinder bore. A semi-spherical depression 42 is formed in the rear of head portion 39 to accommodate the semi-spherical forward end of stamping 40, the parts 39 and 40 being welded or brazed together along their contacting surfaces. Stamping 40 may be shaped by a series of operations including a blanking operation, a series of drawing operations to gradually extend the body of the stamping until it culminates in the semi-spherical end 44, and then a flanged operation to form the axially extending flange 43. A small stamping 45 may be welded or otherwise secured to the stamping 40 to aid in positioning the sealing element 24.

The modified piston shown in Fig. 6 may best be formed of plastic material. It comprises a forward portion 46 and a rear portion 47 both of which may be conventionally formed by utilizing molding machinery. Each of the portions 46 and 47 are separately formed moldings. To form moldings of this type, powdered material is placed in the lower half of the mold, the top half of the mold is lowered to a closed position and the mold is then heated to produce the finished plastic molding. The molding machine contains a multiplicity of molds which travel circumferentially about a central axis. The heating operation takes place while a mold travels from its loading to its unloading position. At the unloading position, the molds separate, and a revolving friction wheel contacts some portion of the outer periphery of the molding which projects from the mold and unscrews the molding from the mold. All of the above operations are automatic in the so-called bottle-cap molding machine, to which type of molding these parts are particularly well suited. Because of the method used in molding these plastic parts the parts 46 and 47 must be formed separately so that from one end to the other of each part the changes in the diameter of each part will constantly increase or constantly decrease the diameter of the part as they move from one end to the other of either part. There cannot be on a single part a relatively small diameter portion between two larger diameter portions as this would make it impossible to remove the upper one-half of the mold. A sleeve part 49, also a plastic molding, may be positioned around the body or part 47 to form a radially extending flange 50 for positioning sealing element 24.

The modified piston shown in Fig. 7 comprises a stamping 51 which forms the head of the piston and a stamping 52 which forms the body of the piston. A plurality of grooves 53 may be provided in the head 51 by coining the edges of the head and thereafter trimming the outer cylindrical surfaces of the head to cut off excess material. The purpose in forming the grooves 53 is of course to make it possible to form the passages 27 by a punching process as explained above in Fig. 3. The body stamping 52 may be formed by first a blanking operation and then a long series of drawing operations to lengthen the body sufficiently by forming a deep enough opening between the bottom end 55 and its rear flange or skirt 54. The bottom end or front edge 55 may be secured to the head 51 by welding as indicated by the series of x's. A small stamping 56 may be welded to the large stamping 52 to position the sealing member 24. Likewise a plug 57 having its forward edges 58 chamfered and its rearward edges semi-spherically recessed as at 59 may be dropped into the interior of the stamping 52 in order that the recessed portion 59 may provide a seat for ball 25 of rod 15.

The piston shown in Fig. 8 comprises a stamped head portion 60 formed in the same manner as head portion 51 of Fig. 6, and two drawn telescoped stampings, 61 and 62 which cooperate to form the body and skirt of the piston. Both of the stampings 61 and 62 may be formed by a blanking operation followed by several drawing operations to extend them to the proper length. The forward end 63 of stamping 61 may be secured to the head 60 by welding, while an inwardly curved neck portion 64 may be formed in the stamping 61 to support the inward end 65 of stamping 62. At the same time the inward end 65 of stamping 62 is semi-spherical in shape to receive the ball 25 of rod 15. The sealing element 24 may be positioned between the rear flange 66 on stamping 61 and the rear flange 67 on stamping 62. Stampings 61 and 62 may be welded together along their contiguous surfaces.

Although I have described specifically several embodiments of my invention, it is not my intention to limit the scope of my invention to the specific embodiments described but only to limit the scope by the terms of the following claims.

I claim:

1. For use in a master cylinder having a cylindrical bore, a piston comprising a head portion upset to form a forward surface having a diameter approximately equal to the diameter of the cylinder bore, a body portion formed by cutting a tube to the required length and extending one end thereof over the small diameter end of the head portion, and a skirt portion formed by stamping and secured around the body portion adjacent its rear end.

2. The method of forming a piston comprising upsetting a cylindrical bar to form an annular flange on one end thereof, cutting a tube to the desired length, extending one end of the tube over the small diameter portion of the cylinder bar and securing it thereto; shaping a sealing element supporting member by a series of stamping processes, and then securing the said member to the outer cylindrical surface of the tube adjacent the end thereof which is farthest from the cylindrical bar.

3. The method of making a master cylinder piston comprising forming in part by an upsetting process a front portion having a radially outwardly extending forward flange to slidingly engage the wall of the cylinder bore and having a recess at the rear thereof, forming a body portion by a stamping process including a series of drawing operations to have a forward semi-spherical end adapted to seat in the semi-spherical recess of the other portion and a radially outwardly extending flange at the rear end thereof adapted to slidingly engage the wall of the cylinder bore, and welding the two parts together along the surface of the recess.

4. A master cylinder piston comprising a pair of plastic moldings secured together, each forming at the end thereof away from the connecting end therebetween an annular radially extending flange having an outer cylindrical surface corresponding approximately to the inner wall of the cylinder bore.

5. A master cylinder piston comprising three stamped portions, one of which forms a head having an outer cylindrical surface approximately equal in diameter to the diameter of the cylinder bore, and another having a small diameter portion extending longitudinally along the axis of the cylinder bore and a large diameter flange at the end farthest from the head stamping, said flange having an outer cylindrical surface approximately equal in diameter to the diameter of the cylinder bore.

6. A master cylinder comprising a reservoir portion, a pressure portion, and a piston reciprocable in the pressure portion having a front portion with an outer cylindrical surface approximately equal in diameter to the bore of the master cylinder, and a rear portion formed separately from the front portion and secured thereto having a radially extending flange with an outer surface of a diameter approximately equal to the diameter of the master cylinder bore, said flange being longitudinally separated from the front portion when the said front and rear portions are assembled, thus forming an annular chamber which is adapted to be connected to the reservoir portion.

7. A master cylinder comprising a reservoir portion, a pressure portion, and a piston reciprocable in the pressure portion having a head and skirt each of the same diameter as the cylinder bore and a reduced diameter body portion joining the head and skirt of the piston, the head being formed as a part separate from the body portion and being secured thereto, and the body and skirt together comprising two pieces, one of which has a diameter corresponding to the diameter of the cylinder bore as aforementioned, and the other of which cooperates with the first-mentioned piece to retain an annular sealing element which forms a seal between the piston skirt and the cylinder wall, an annular chamber being formed between the head and skirt of the piston and connected to the master cylinder reservoir portion.

RUDOLPH A. GOEPFRICH.